US005499886A

United States Patent [19]
Short et al.

[11] Patent Number: 5,499,886
[45] Date of Patent: Mar. 19, 1996

[54] COUPLING ASSEMBLY FOR FURNITURE COMPONENTS

[75] Inventors: Michael K. Short; Jerry D. Grieser, both of Archbold; Richard A. Nelson, Napoleon; Thomas B. Warner, Archbold; Ferrol M. Maguire, West Unity, all of Ohio

[73] Assignee: Sauder Woodworking Co., Archbold, Ohio

[21] Appl. No.: 205,592

[22] Filed: Mar. 2, 1994

[51] Int. Cl.⁶ .................................................. F16B 12/08
[52] U.S. Cl. ........................ 403/381; 403/410; 403/404
[58] Field of Search ............................. 403/381, 345, 403/410, 404, 179, 381

[56] References Cited

U.S. PATENT DOCUMENTS

| | | | |
|---|---|---|---|
| 2,116,584 | 5/1938 | Shelby | 403/381 |
| 4,138,094 | 2/1979 | Thir | 403/381 X |
| 5,090,835 | 2/1992 | Cox | 403/381 X |

FOREIGN PATENT DOCUMENTS

| | | | |
|---|---|---|---|
| 1148478 | 12/1957 | France | 403/381 |
| 1236806 | 6/1960 | France | 403/381 |
| 2267469 | 11/1975 | France | 403/381 |
| WO92/19874 | 11/1992 | WIPO | 403/381 |

*Primary Examiner*—Anthony Knight

[57] ABSTRACT

A coupling assembly for joining together two furniture members including a first member having an outwardly projecting tongue. The tongue includes a central portion adjacent to the first member and an enlarged terminal portion spaced from the first member. The terminal portion includes a plurality of walls that form a geometric configuration. The assembly further includes a second member that defines a groove. The groove has a configuration corresponding to the central portion and the terminal portion of the tongue. The groove receives the tongue portions to join together the first member and the second member.

10 Claims, 2 Drawing Sheets

5,499,886

COUPLING ASSEMBLY FOR FURNITURE COMPONENTS

BACKGROUND OF THE INVENTION

The present invention is directed to a coupling assembly for joining together two furniture members. More specifically, the invention is directed to a coupling assembly in which a first member has a tongue with an enlarged terminal portion that engages a groove defined in the second member to join the members together.

The present invention has particular application in "ready-to-assemble" furniture. Ready-to-assemble or "RTA" furniture consists of manufactured furniture components that are sold to consumers in an unassembled condition. The consumer assembles the components to construct a particular furniture item, which can include such things as bookcases, desks, tables, stands, etc. There is a need for furniture components that are easy for the consumer to assemble. There is also a need for furniture components that are durable once the furniture item is assembled. The present invention satisfies both of these needs.

One of the most difficult furniture components for the consumer to attach to a furniture item is a trim piece on the edge of a furniture member. In the past, brackets having a 90° angle have been attached to the perpendicular intersection of the trim piece and the furniture member to hold the trim piece in place. It has been found that use of a bracket can lead to unsatisfactory results because of the difficulties involved in screwing the bracket in place and maintaining proper alignment between the respective pieces.

The present invention provides an improved tongue and groove coupling assembly that eliminates the need for brackets to join together two furniture members. This allows for easy attachment of the members. The invention also maintains the proper alignment of the respective members to ensure an aesthetically pleasing appearance for the furniture item.

SUMMARY OF THE INVENTION

The present invention is directed to a coupling assembly for joining together two furniture members. The assembly includes a first member having an outwardly projecting tongue. The tongue includes a central portion adjacent to the first member and an enlarged terminal portion spaced from the first member. The terminal portion includes a plurality of walls that form a geometric configuration, such as a rectangle.

The assembly further includes a second member that defines a groove. The groove has a configuration corresponding to the central portion and the terminal portion of the tongue. The groove receives the tongue portions to join together the first member and the second member.

The primary object of the present invention is to provide a coupling assembly that is easy to use.

An important object of the present invention to provide a coupling assembly that is durable.

Another important object of the present invention is to provide a coupling assembly that maintains proper alignment between the furniture members.

Other objects and advantages of the present invention will become apparent upon a review of the drawings and the following detailed description of the invention.

DETAILED DESCRIPTION OF THE PREFERRED EMBODIMENT

Figure 1:
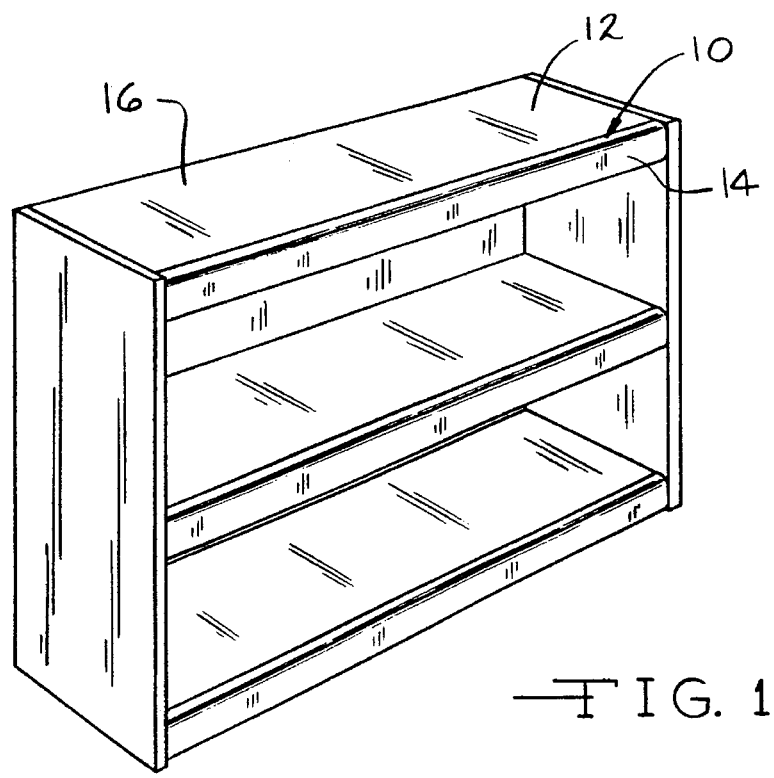
FIG. 1 is a perspective view of a bookcase showing two furniture members joined together by the coupling assembly according to the present invention.
Figure 2:
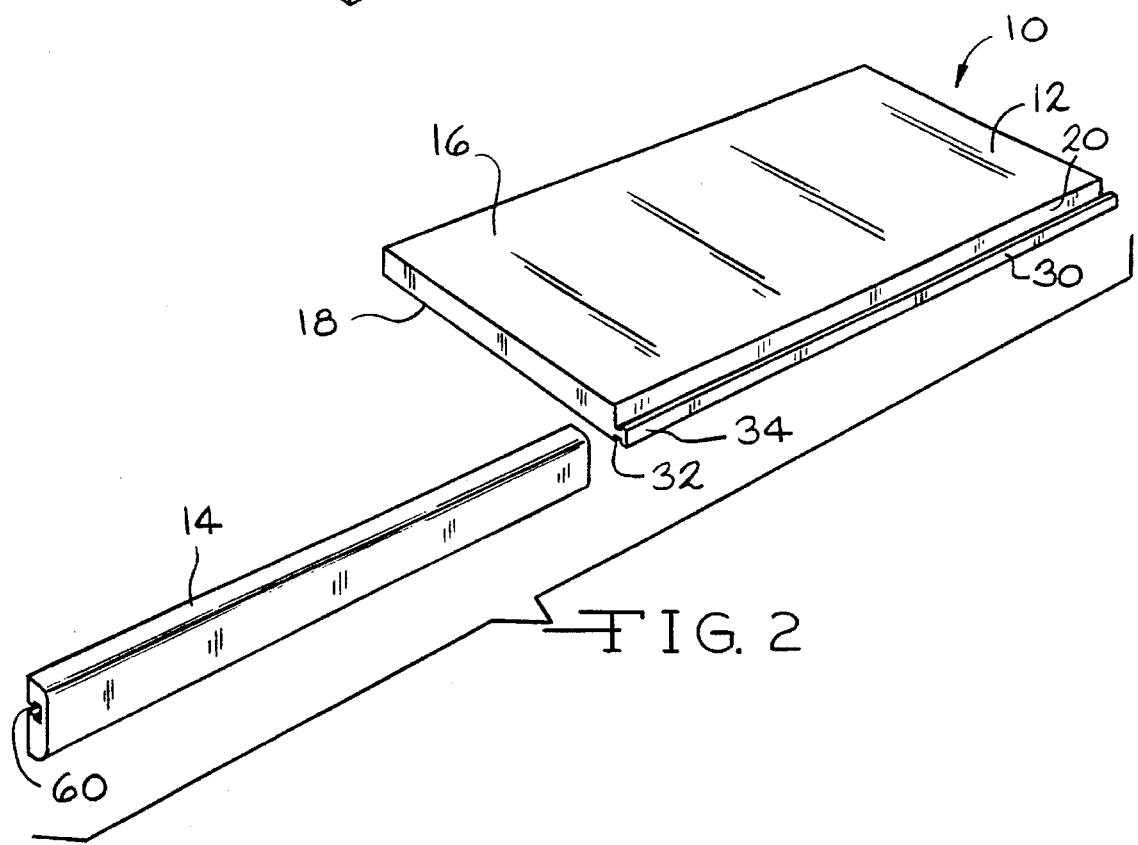
FIG. 2 is a perspective view of the coupling assembly of the present invention having a first member and a second member.
Figure 3:
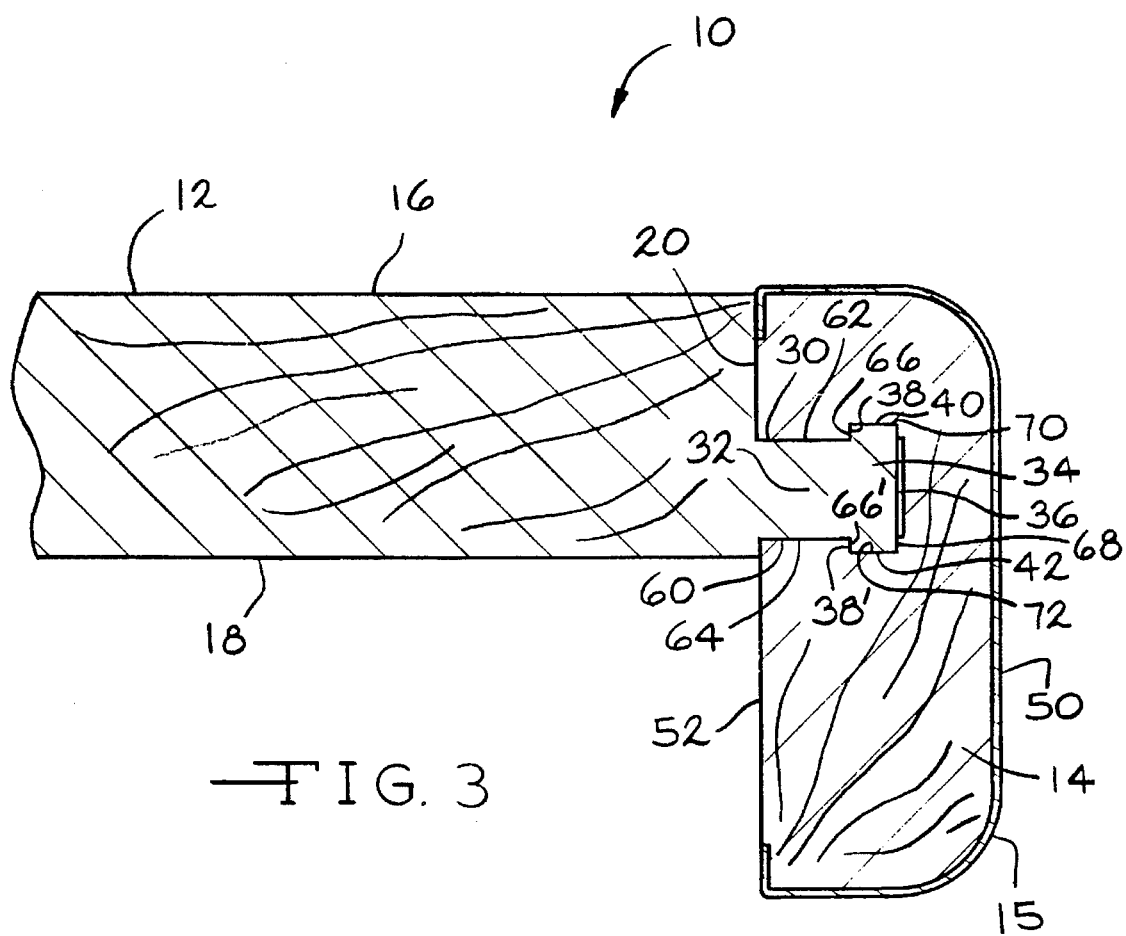
FIG. 3 is a side elevational view of the coupling assembly of the present invention showing the first member joined to the second member.

The present invention will now be described in detail with reference being made to the accompanying drawings. Referring to FIGS. 1 and 2, the coupling assembly is indicated by the reference number 10. The coupling assembly 10 includes a first member 12 and a second member 14. The first and second members can be made of natural or synthetic particles or fibers that have been pressed or otherwise formed into composite furniture components. Examples of natural particles can include wood and various grasses such as straw. Examples of synthetic particles and/or fibers can include plastic and fiber glass. As shown in FIG. 3, a thin laminate 15 having a wood grain appearance can be applied to the members. In the present embodiment, the first member 12 is the top of a bookcase and the second member is a trim piece. It should be understood that the present invention is applicable to furniture components that can be composed of a variety of materials and have a variety of shapes and purposes. The first member 12 includes a top surface 16, a bottom surface 18 and at least one edge 20. The top surface 16 is parallel with respect to the bottom surface 18. The edge 20 extends in a perpendicular relationship between the top and bottom surfaces.

Referring to FIGS. 2 and 3, the first member 12 includes an outwardly projecting tongue 30. The tongue 30 extends longitudinally with respect to the edge 20 of the first member 12. The tongue 30 includes a central portion 32 adjacent to the edge 20 of the first member 12. The tongue 30 further includes an enlarged terminal portion 34 spaced from the edge 20 of the first member 12.

Referring to FIG. 3, the "T-shaped" terminal portion 34 of the tongue 30 includes a front wall 36 and at least one opposed back wall 38. In the present embodiment, the assembly includes two back walls 38 and 38' that extend upwardly and downwardly, respectively, from the central portion 32 of the tongue 30. When measured, the combined height of the back walls 38 and 38' are added to the height of the central portion 32 to have a total height that is equal to the height of the front wall 36. The terminal portion 34 further includes a top wall 40 and an opposed bottom wall 42. In the present embodiment, the front wall 36 is parallel to the back walls 38 and 38'. The top wall 40 is parallel to the bottom wall 42. The front wall 36 and back walls 38 and 38' are perpendicular to the top and bottom walls 40 and 42. When the front wall 36, back walls 38 and 38', top wall 40 and bottom wall 42 are so arranged, the terminal portion has a rectangular geometric configuration when the front and back walls 36 and 38, 38' have equal heights greater than the equal widths of the top and bottom walls 40 and 42. If the heights of the front and back walls 36 and 38, 38', and the width of the top and bottom walls 40 and 42 are all equal, the terminal portion 34 has a square geometric configuration. It has been found that rectangular and square geometric configurations are superior in the present assembly. However, the terminal portion 34 can have a variety of other geometric configurations depending on the application.

Referring to FIGS. 2 and 3, the second member 14 includes an exterior side 50 and an interior side 52. A longitudinally extending groove 60 is defined on the interior side 52. The groove 60 as defined by the second member 14 includes a first central portion receiving wall 62 opposed to a second central portion receiving wall 64. The walls 62 and 64 extend inwardly perpendicular to the interior side 52 of the second member 14. The groove 60 is further defined by at least one back receiving wall 66. In the present embodiment, there are two back receiving walls 66 and 66'. The back receiving walls 66 and 66' are opposed to a front receiving wall 68. The receiving walls 66, 66' and 68 are in a parallel relationship to one another. A top receiving wall 70 is opposed to and parallel to a bottom receiving wall 72. The back and front receiving walls 66, 66' and 68 are in a perpendicular relationship to the top and bottom receiving walls 70 and 72. When the back and front receiving walls 66, 66' and 68 have equal heights greater than the equal widths of the top and bottom receiving walls 70 and 72, a rectangular geometric configuration is present. If the back walls 66, 66', front wall 68, top and bottom receiving walls 70 and 72 are all equal, a square geometric configuration is formed. The geometric shape of the groove 60 will correspond to the geometric shape of the central portion 32 and the terminal portion 34 of the tongue 30.

As shown in FIGS. 2 and 3, when the second member 14 is to be joined to the first member 12, the tongue 30 is inserted into the groove 60 by sliding the interior side 52 of the second member 12 along the edge 20 of the first member 12. When the tongue 30 is inserted in the groove 60, the corresponding walls of the tongue 30 and the groove 60, as described above in detail, come into close contact to hold the second member 14 firmly in place on the first member 12. As shown in FIG. 3, the enlarged terminal portion 34 of the tongue 30 prevents the frontal removal of the second member 14 from the first member 12.

The foregoing disclosure and description of the invention is illustrative and explanatory thereof and various changes can be made to the invention within the scope of the appended claims.

We claim:

1. A coupling assembly for joining together two ready-to-assemble furniture members comprising, in combination:

a composite furniture member consisting of compressed wood particles having an outwardly projecting tongue, said tongue including a central portion and a single terminal portion including a front wall and two opposed back walls, a top wall and an opposed bottom wall, said front wall being substantially parallel to said back walls, said top wall being substantially parallel to said bottom wall, said front and back walls being substantially perpendicular to said top and bottom walls, said terminal portion having a geometric configuration; and a composite trim member consisting of compressed wood particles having an exterior side and an interior side, said trim member defining a single groove on said interior side, said groove being defined by opposed first and second central portion receiving walls that extend inwardly perpendicular to said interior side of said trim member, said trim member further defining two back receiving walls opposed to and substantially parallel to a front receiving wall, a top receiving wall opposed to and substantially parallel to a bottom receiving wall, said front and back receiving walls being in a substantially perpendicular relationship to said top and bottom receiving walls, whereby said groove receives said central portion and said terminal portion of said tongue to join together said furniture member and said trim member.

2. The coupling assembly of claim 1, wherein said first member consists of a top surface, a bottom surface and at least one edge, said top and said bottom being substantially parallel with respect to one another, said edge extending in a substantially perpendicular relationship between said top and bottom surfaces.

3. The coupling assembly of claim 2, wherein said tongue extends longitudinally with respect to said edge.

4. The coupling assembly of claim 1, wherein said front, back, top and bottom walls form a substantially rectangular geometric configuration.

5. The coupling assembly of claim 1, wherein said geometric configuration is a rectangle.

6. The coupling assembly of claim 1, wherein said geometric configuration is a square.

7. The coupling assembly of claim 1, wherein said groove extends longitudinally with respect to said interior side of said second member.

8. The coupling assembly of claim 1, wherein said front, back, top and bottom receiving walls form a substantially rectangular configuration.

9. The coupling assembly of claim 1, wherein said second member defines a groove having a substantially rectangular configuration.

10. The coupling assembly of claim 1, wherein said second member defines a groove having a substantially square configuration.

\* \* \* \* \*